United States Patent [19]

Takeuchi

[11] 4,149,192
[45] Apr. 10, 1979

[54] TRANSMISSION OF ENCODED FACSIMILE SIGNALS AT VARIABLE INTERVALS COMMENSURATE WITH RECORDING TIME

[75] Inventor: Tadasu Takeuchi, Tokyo, Japan

[73] Assignee: Matsushita Graphic Communication Systems, Inc., Japan

[21] Appl. No.: 806,611

[22] Filed: Jun. 15, 1977

[30] Foreign Application Priority Data

Jun. 15, 1976 [JP] Japan .................................. 51-70594

[51] Int. Cl.² .......................... H04N 1/38; H04N 1/40
[52] U.S. Cl. .................................... 358/260; 358/261; 346/154
[58] Field of Search ....................... 358/260, 261, 288; 346/154

[56] References Cited

U.S. PATENT DOCUMENTS

| | | | |
|---|---|---|---|
| 3,643,016 | 2/1972 | Dattilo | 358/260 |
| 3,662,396 | 5/1972 | Brown | 346/154 |
| 3,769,628 | 10/1973 | Kenny | 346/154 |
| 3,902,009 | 8/1975 | Perreault | 358/288 |
| 4,034,406 | 7/1977 | Tsuchiya | 358/261 |

Primary Examiner—Howard W. Britton
Attorney, Agent, or Firm—Lowe, King, Price & Becker

[57] ABSTRACT

In a facsimile communication system wherein a document is scanned along its line path to generate a binary signal waveform for each line scan and the length of black or white run of each binary digit in the waveform is translated into a corresponding code for transmission, the binary signal waveform is equally divided into a plurality of data blocks which are discriminated between significant data blocks each containing at least one "black" data bit and insignificant data blocks each being entirely at "white" level. Only the significant data blocks are counted to measure the length of recording time for the corresponding line scan. The end of the measured time is detected to proceed with the next line scan so that the next sequence of codes is transmitted at an instant which is variable to correspond to a variable recording time at the receiver station where the received codes are decoded to recover the original waveform for recording only the significant data blocks while disregarding the insignificant data blocks.

4 Claims, 6 Drawing Figures

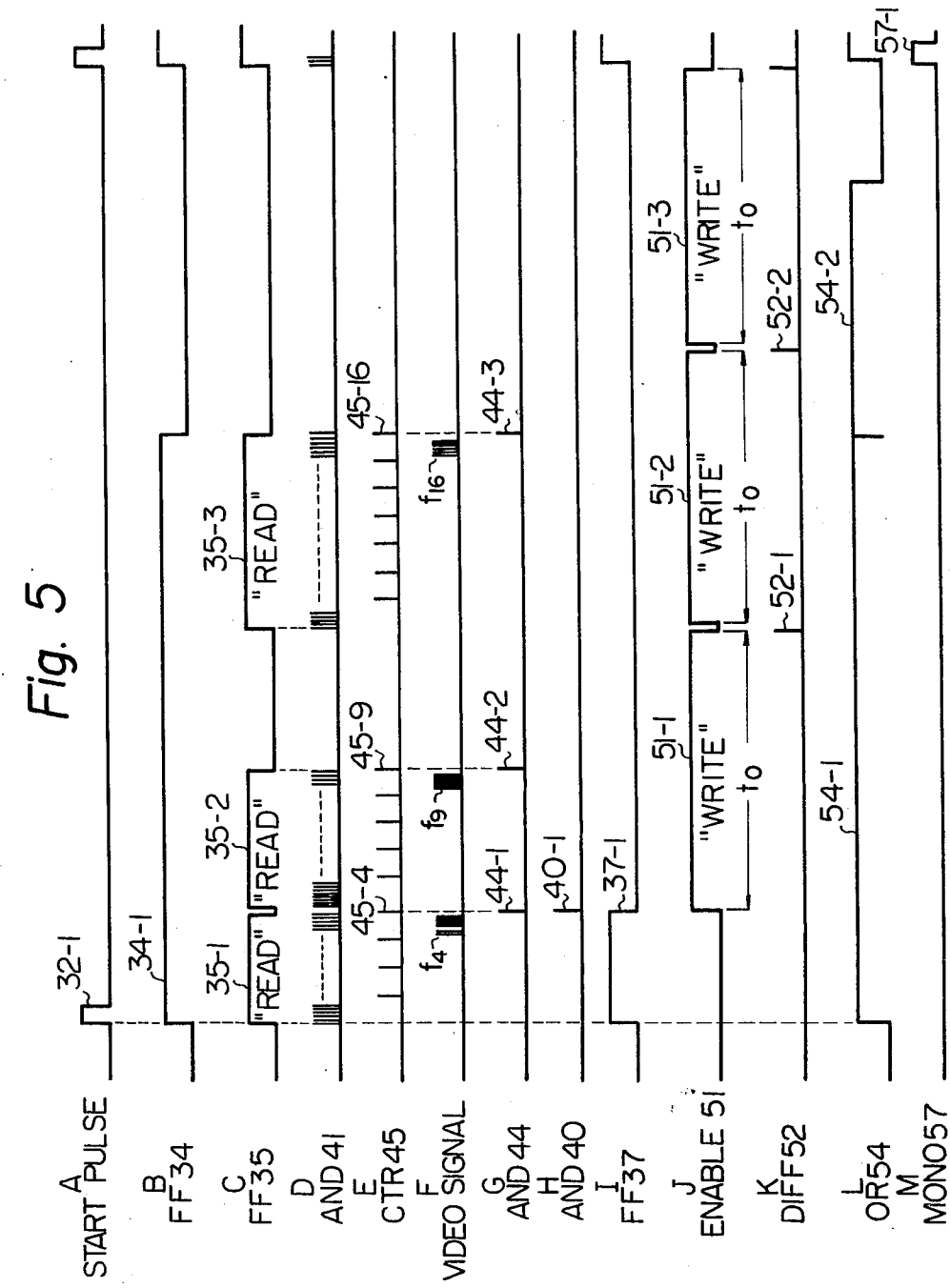

TRANSMISSION OF ENCODED FACSIMILE SIGNALS AT VARIABLE INTERVALS COMMENSURATE WITH RECORDING TIME

THE FIELD OF THE INVENTION

The present invention relates generally to facsimile communications and more particularly to a system in which coded facsimile signals are transmitted in succession without loss of time taking account the variable length of recording time at the receiving end of a transmission line.

BACKGROUND OF THE INVENTION

Progress in facsimile and related fields has developed to such an extent that signals derived from graphical and printed or typewritten documents may be economically and accurately transmitted from one location to another. Although the advances in these fields have made possible the development of systems having relatively low cost, ease of operation, and reliability, there remains the need for an increase in the speed of transmission required to satisfactorily transmit a facsimile signal.

Most graphical and printed or typewritten documents include a very substantial amount of redundant information, such as the background or "white" color upon which the contrasting or "black" intelligence information appears. Further, such graphical and printed documents exhibit a considerable degree of spatial correlation. The spatial correlation between signals found between signals along a single line path is effectively utilized in the prior art system known as run-length coding wherein a length of black or white run is coded.

In order to utilize the run-length coding technique, the document must be scanned at a speed compatible with the speed at which the image signal is encoded. One example of scanners is a solid-state image scanner which includes an array of photodiodes successively arranged in a row of 2,048 elements and is arranged to be successively driven by clock pulses to scan a line path so that each line path is resolved into 2,048 picture elements and for each line scan a sequence of 2,048 bits of video information is generated from the photodiode array.

Although the facsimile signal may be transmitted at a speed much higher than is transmitted without coding, the speed of image reconstruction at the receiver station will place limitations on the overall transmission time since the transmitter will have to await after transmission of each line video signal until the receiver station becomes ready to accept the next video signal if substantial length of time is involved in the image reconstruction. In the prior art system, a fixed length of time must be allowed for the transmitter to send the next video signal resulting in a loss of substantial period of time for transmission.

SUMMARY OF THE INVENTION

The primary object of the invention is to minimize the overall transmission time of run-length coded facsimile signals by measuring in advance at a transmitter station an expected length of time needed for reconstruction of each decoded line facsimile signal at a receiver station.

Another object of the invention is to provide an improved facsimile communication system in which the facsimile signal derived from each line scan is encoded while at the same time divided equally into a plurality of data blocks to count the number of "black" level-containing data blocks to measure the reconstruction time and the next line path is caused to be scanned at the end of the measured reconstruction time so that encoded facsimile signals are transmitted at variable intervals depending on the count of "black" containing data blocks, and at the receiver station the "black" data blocks are recorded while "all white" data blocks are disregarded.

Specifically, the receiver station includes an array of energy transfer elements such as heating elements 2,048 in number successively arranged along a line path and divided equally into a plurality of groups equal in number to the divisions of the signal at the transmitter, that is, data blocks. The heating elements of each group are simultaneously energized by currents representing the "black" level picture elements. A control circuit is provided to disregard the data blocks which are entirely at "all white" level so that the corresponding groups of heating elements are skipped to the next group for subsequent recording operations. For recording purposes, a sheet of thermally sensitive paper is positioned in contact with the array of heating elements. Each heating element has a minimum time interval in which intelligence is transferred to the surface of thermally sensitive paper so that each group of elements is energized during that time interval. At the transmitter, this mimimum time interval is taken into account to measure the variable recording time by multiplying it by the count of the "black" level containing data blocks.

BRIEF DESCRIPTION OF THE DRAWINGS

These and other objects, features and advantages of the present invention will become apparent when the following detailed description is read in conjunction with the accompanying drawings, in which:

FIG. 5 is a series of waveforms appearing at various points of the embodiment of FIG. 4A to facilitate understanding the operation of the receiver.

DESCRIPTION OF THE PREFERRED EMBODIMENTS

Figure 1:
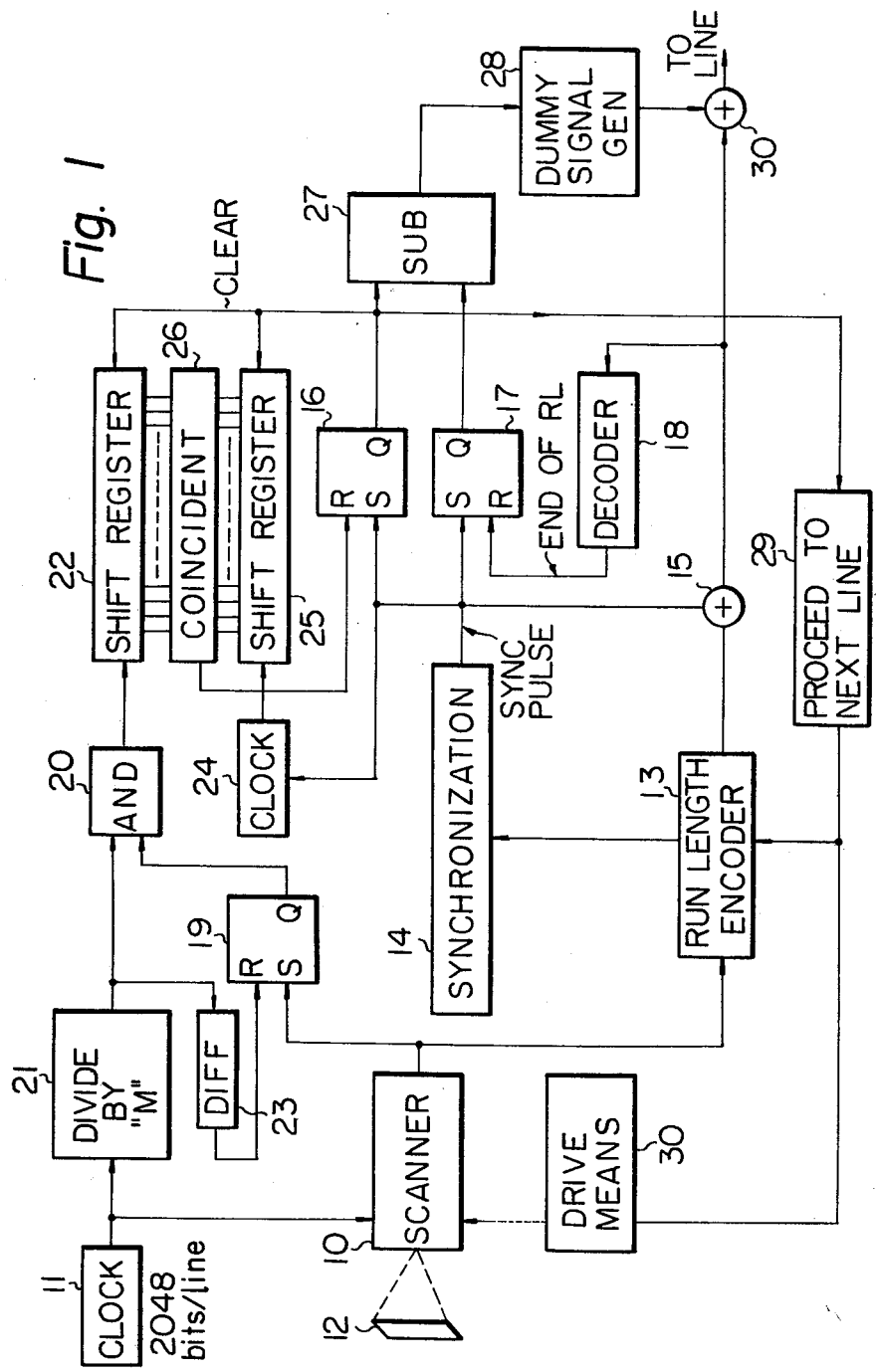
FIG. 1 is a schematic circuit diagram of a facsimile transmitter embodying the invention.
Figure 2:
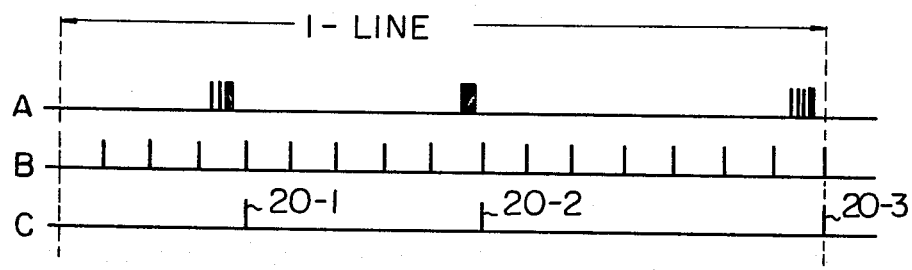
FIGS. 2 and 3 are timing diagrams useful for describing the operation of the embodiment of FIG. 1.

Referring now to FIG. 1, a transmitter of a facsimile communication system is schematically shown. A solid-state image scanner 10 is provided to successively scan each of a plurality of line paths within a document 12 positioned in proximity thereto to generate for each line scan a binary signal waveform as illustrated in FIG. 2A. The scanner 10 may be one of any conventional designs which include an array of photodiodes 2,048 in number arranged successively in a row to be electrically driven by clock pulses supplied from a clock source 11. The clock generator 11 generates a train of drive pulses at a rate of 2,048 bits per scan interval and feeds its output to a divide-by-M counter 21 as well as to the scanner 10.

The binary signal waveform generated by the scanner 10 comprises 2,048 bits of binary digits corresponding to the light levels of the scanned area of the document 12 and is applied in sequence to a run-length encoder 13. The run-length encoder 13 provides digital encoding of the run-length of each binary digit into a corresponding digital code word so as to achieve compression of transmission time as is well known in the art. If the binary signal waveform is assumed to be transmitted to a receiver station without undergoing digital coding operation, the transmission time would be severely restricted by the bandwidth limitations of a transmission medium such as telephone lines so that the scanning speed would have to be much lower than the speed at which the scanner 10 is driven. Therefore, the scanning speed of the invention is selected at a value which is compatible with the speed of encoding. The output from the encoder 13 is a series of digital codes each representing the length of white or black run of the binary digits or elemental picture areas on the document 12, and a series of such codes is transmitted via summation points 15 and 30 over a transmission line to a receiver station at the distant end of the line. Before transmission of a series of codes derived from each line scan, a synchronization signal is transmitted to enable the receiver station to recognize the start of each line video signal.

The synchronization signal is generated from a synchronizer 14 which, when signalled from the encoder 13 at the start of encoding, provides an output to summing junction 15 to precede the digital code words. The synchronization signal is also applied to the set terminals of flip-flops 16 and 17 to change their binary states.

To the output of summing junction 15 is connected a decoder 18 to detect the end of each sequence of digital codes to reset flip-flop 17 to its original binary state. Therefore, the Q output of flip-flop 17 is at the high voltage level during the transmission of a series of encoded signals and a synchronization signal. Since the synchronization signal exists for a very short duration as compared with the interval of the encoded signal, the Q output of flip-flop 17 represents a measure of the transmission time for each sequence of encoded facsimile signals.

To the output of the divider counter 21 is connected an AND gate 20 which is enabled at every count of M clock pulses (see FIG. 2B). A flip-flop 19 is provided with its set terminal connected to the output of scanner 10 and its Q output to the AND gate 20. The flip-flop 19 thus changes its binary state in response to a "1" binary digit representing the black level of a document's elemental area that occurs first in the binary signal waveform and changes to the original binary state in response to an output from a differentiater 23 which occurs at the trailing edge of the output from the counter 21. Consequentially, the AND gate 20 is activated to provide an output for each of N divisions or data blocks of M binary digits each (where N × M = 2,048 bits) whenever the data block contains at least a "1" data bit. For example, if the binary signal waveform is assumed to contain "1" binary digits within the fourth, ninth and 16 data blocks as shown in FIG. 2A, "1" bits 20-1, 20-2 and 20-3 are supplied from AND gate 20 to shift register 22 (see FIG. 2C). Such data block is termed "significant data block" since at the receiver station only such significant data blocks are used for recording operation while those data blocks each of which is entirely at the "0" logic level corresponding to the white level of the document are termed "insignificant data blocks" since such blocks are disregarded or skipped to minimize the overall recording time.

A shift register 22 is provided to accept the output from the AND gate 20. This register has a storage capacity of N bit positions corresponding to the N data blocks derived from each line scan. A second shift register 25 is connected to a source of clock pulses 24. The clock source is triggered by the synchronization signal to generate pulses at an interval $t_o$ which is the time needed for reconstructing a significant data block on a recording medium to be described later. Therefore, the data stored in shift register 22 is a series of "1" bits which occupy its storage locations successively from the left-most bit position although the incoming binary data may occur randomly depending upon the randomness of the occurrence of black-level elemental picture areas within the scanned line path. Coincidence will occur between the data stored in shift registers 22 and 25 at an integral multiple of the duration $t_o$ when the number of stored "1" bits of each shift register equals to the number of corresponding "1" bits stored in the other register. Such coincidence is detected by a coicident circuit 26 which is connected between the storage locations of both registers and provides an output to the reset terminal of the flip-flop 16. Since the time interval $t_o$ is much greater than the interval between successive outputs from the counter 21, the high voltage level output of flip-flop 16 substantially represents a measure of an expected time interval needed for recording a significant data block detected by the shift registers 22, 25 and coincident circuit 26.

The outputs of flip-flops 16 and 17 are applied to a subtractor 27 where the time difference between the two inputs is derived and applied to a dummy signal generator 28 whose output is connected to the summing junction 30 for transmission. Shift registers 22 and 25 are cleared when the flip-flop 16 is restored to the original binary state and at the same time a shift pulse is generated from a proceed-to-next-line circuit 29 which applies its output to the run-length encoder 13 and to a drive means 30. The run-length encoder 13 is cleared to be ready to accept the next line binary signal waveform for subsequent encoding, while the drive means 30 shifts the scanner 10 in a direction perpendicular to the scanning direction by the width of a line path.

It is to be noted that the dummy signal generator 28 can be dispensed with if the receiver station is so conditioned as to respond only to the valid binary signals so that noise which may present during the interval of such dummy signal will not adversely affect the decoding operation at the receiving end.

Figure 3:
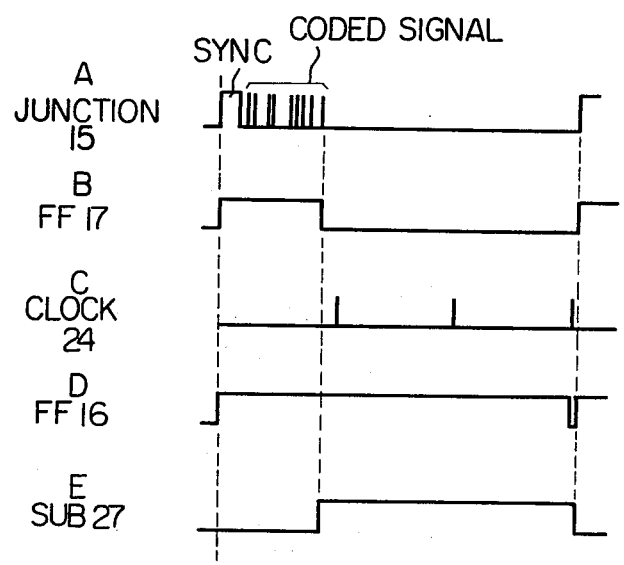

FIG. 3A illustrates a waveform which includes a synchronization signal followed by a sequence of digital codes. The transmission time of the coded signals plus sync signal is detected by the flip-flop 17 as shown in FIG. 3B. Since the binary signal waveform is assumed to have contained three significant data blocks, shift register 25 accepts a count of three clock pulses from source 24 and flip-flop 16 switches to the low voltage level at the three count of the clock pulses as shown in FIGS. 3C and 3D. FIG. 3E is a waveform resulting from the output from the substrator 27.

Figure 4A:
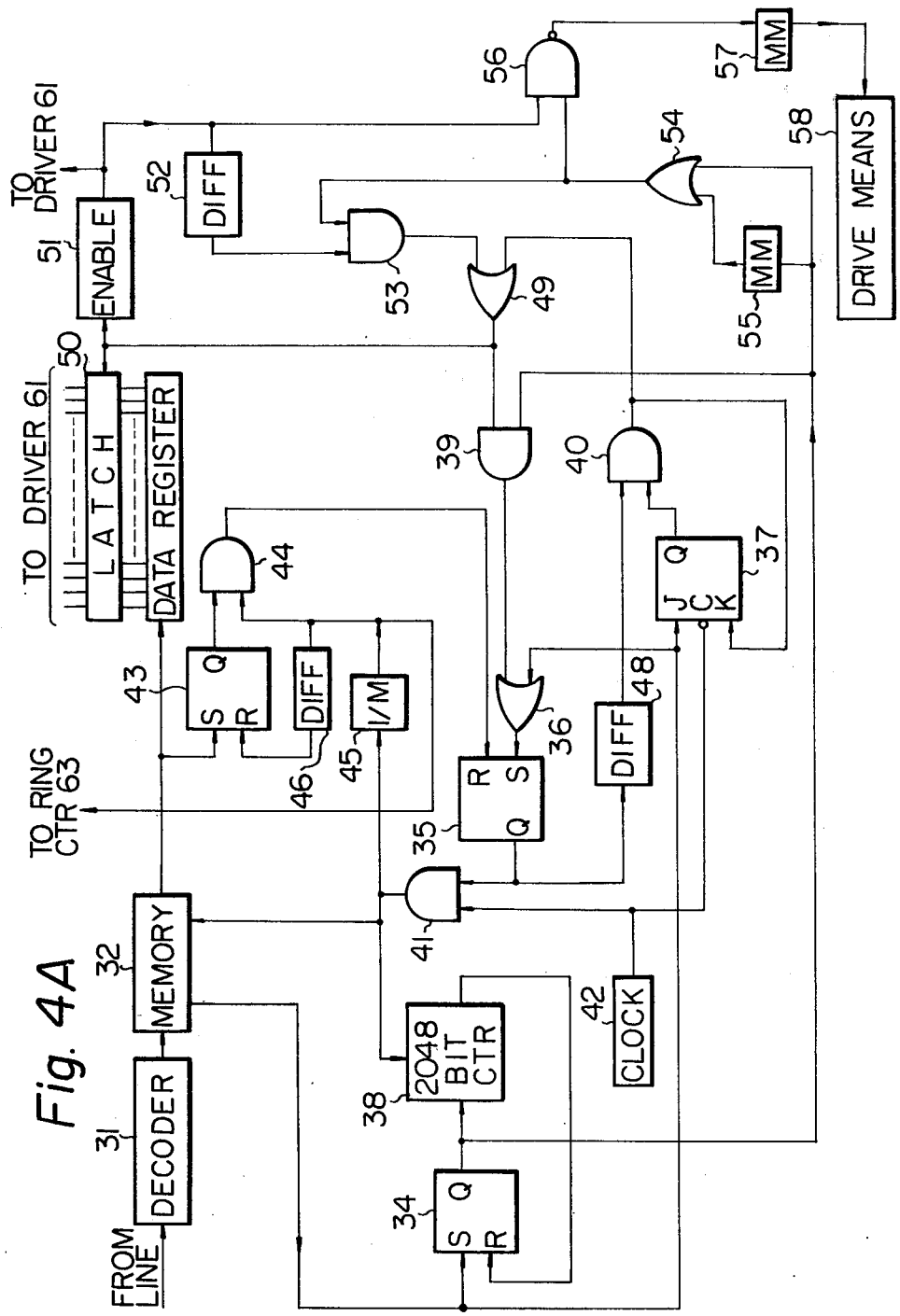
FIGS. 4A and 4B are schematic circuit diagrams of a facsimile receiver used in conjunction with the transmitter of FIG. 1.
Figure 4B:
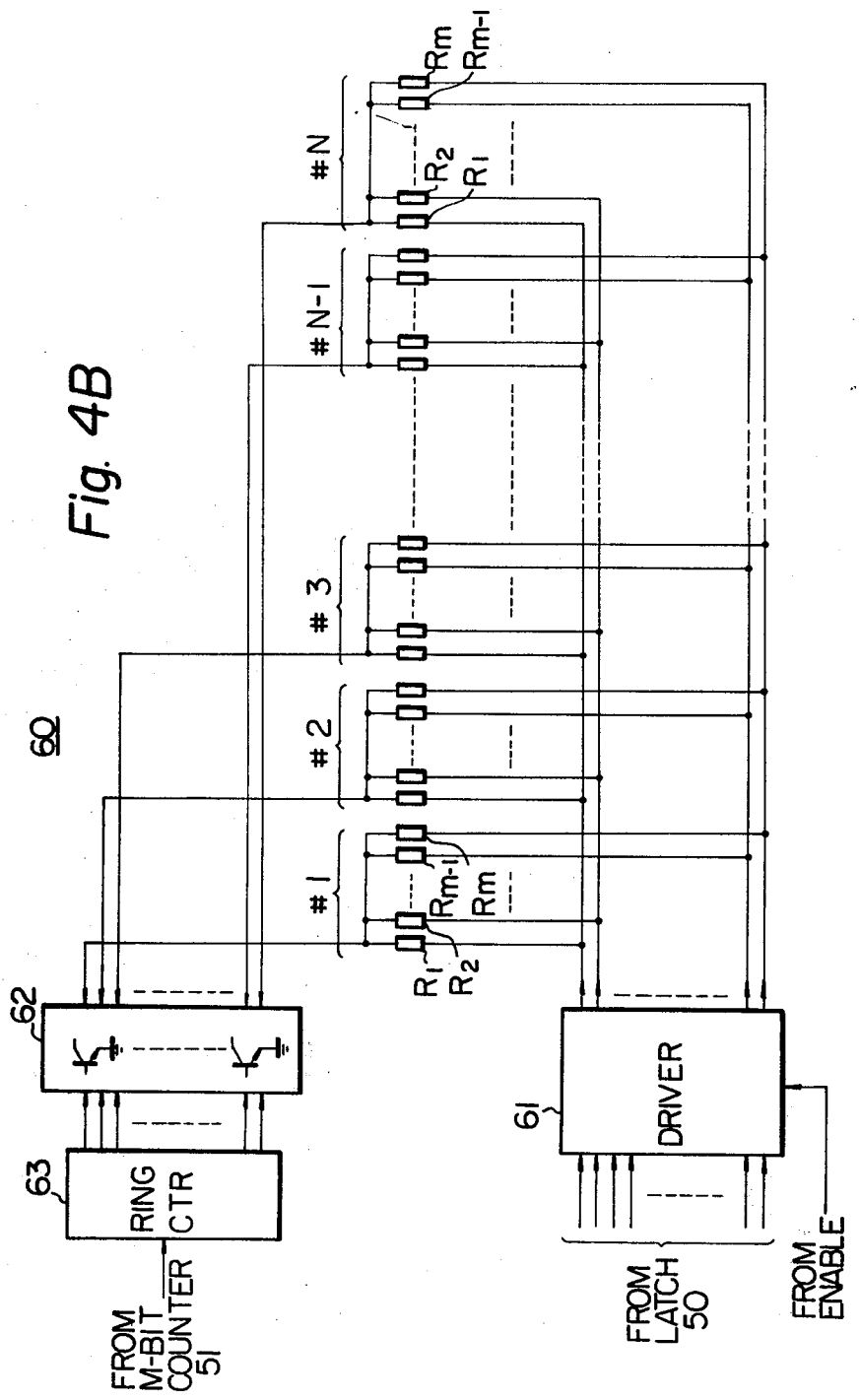

Referring to FIGS. 4A and 4B, an embodiment of a receiver of the communication system is illustrated. At the receiver station, the transmitted signal is received by a run-length decoder 31 to recover the original binary signal waveform. The recovered waveform is then transferred to a memory device 32 in such manner that a one-line video signal is stored on 2,048 bits storage locations which will be later read out by a instruction signal applied thereto. A data register 33 having a storage capacity of M bits is provided to accept the data read out from the memory device 32.

As soon as the memory 32 is fully loaded by the 2,048 bits of information, a start signal 32-1 is delivered from the memory 32 to the set terminal of flip-flop 34 which in response thereto changes its binary state (FIGS. 5A and 5B) producing a high voltage signal 34-1 to enable a 2,048-bit counter 38 and AND gate 39 and provide an output 54-1 (FIG. 5L) from OR gate 54 to enable AND gate 53. The start pulse 32-1 is also applied to the set terminal of a flip-flop 35 via OR gate 36 to produce a signal 35-1 (FIG. 5C) and also to the J terminal of a flip-flop 37 providing a signal 37-1 (FIG. 5I). The signal 35-1 is a read instruction signal that enables AND gate 41 to pass clock pulses supplied from a clock generator 42 to the memory 32.

The clock generator 42 drives the memory device 32 at a rate of 2,048 bits per scan interval (FIG. 5D). Since the first three data blocks are entirely at white level, that is, insignificant, (M × 3) "0" binary digits are read from the memory 32 and transferred to the data register 33.

The significant data block is detected by a circuit including a flip-flop 43 having its set terminal connected to the output of memory device 32, an AND gate 44, an M-bit counter 45 and a differentiater 46. The flip-flop 43 places a high voltage signal to an input of AND gate 44 whenever a "1" binary digit occurs at its set input terminal to enable the gate 44. The M-bit counter 45 operates to count the output of AND gate 41, that is, the read-out pulses and provides an output for each count of M input pulses to the AND gate 44 to reset the flip-flop 35 at the fourth output 44-1 (FIG. 5G). Data register 33 has been loaded with a significant data block f4 (FIG. 5F) and the memory 32 has ceased to unload its stored bits. The flip-flop 43 is then reset by an output from the differentiater 46 as soon as the output 44-1 is generated.

The resetting of flip-flop 35 results in a low voltage output which is differentiated by a differentiator 48 and applied to the AND gate 40. AND gate 40 is activated to provide a pulse 40-1 which resets flip-flop 37 and at the same time goes through OR gate 49 and AND gate 39 and through OR gate 36 to the flip-flop 36 and sets it again to provide a signal 35-2 to proceed with the next reading operation.

The pulse 40-1 from the AND gate 40 is also applied through OR gate 49 to a latching circuit 50 connected to the data register 33 to receive the significant data block f4 now stored in register 33 for subsequent writing operation as well as for putting data register 33 ready to accept the next data block.

In FIG. 4B, a writing unit 60 of the receiver is shown as comprising a plurality of heating elements which are 2,048 in number and successively arranged along a straight line in contact with the surface of a sheet of thermally sensitive paper and divided into "N" groups of "M" heating elements $R_1, R_2, \ldots R_m$ each. Elements $R_1$ of each group have their one end terminals connected together to a first output terminal of a driver circuit 61 having "M" outputs. Similarly, elements $R_2$ to $R_m$ of each group have their one end terminals connected together to the respective output terminals of the driver 61. Elements $R_1$ to $R_m$ of the group #1 have their opposite end terminals connected together to the first one of N output terminals of a gate-controlled switching matrix 62. Likewise, elements $R_1$ to $R_m$ of each of the remainder groups #2 to #N are connected together to the respective output terminals of the switching matrix 62. The matrix 62 includes a plurality of gate-controlled switching devices such as transistors equal in number to the number of data blocks, the transistors having their respective emitter electrodes connected to ground and their base and collector electrodes connected between respective input and output terminals. The input terminals of the matrix 62 are connected to the output terminals of a ring counter 63 which activates its output lead in succession in response to an input applied from the output of M-bit counter 45. The driver 61 provides amplification of each binary digit received from the latching circuit 50.

At the fourth output 45-4 from the counter 45, the ring counter 63 places its output on lead #4 and provides ground potential to all the heating elements of #4 group to allow them to be energized by currents supplied from the driver 61.

An enabling circuit 51 is provided which is connected to the OR gate 49 to produce in response to the output therefrom a pulse 51-1 (FIG. 5J) with a duration $t_o$ so as to enable the driver 61 during this interval. Currents flow through only those elements which correspond to the "1" binary digits in latch 50. The heat generated in the heating elements is simultaneously transferred to the thermally sensitive recording paper on which data block f4 is recorded.

While the first writing operation as in progress, reading operation has proceeded in a manner identical to that described previously until the ninth data block f9 is detected by AND gate 44 providing an output 44-2 at the ninth output 45-9 from counter 45.

The end of the first writing operating is detected by a differentiater 52 connected to the output of enabling circuit 51 to produce an output 52-1 (FIG. 5k) which is applied to the latching circuit 50 through a circuit including AND gate 53 and OR gate 49. Since the data register 33 has been occupied with data block f9, the application of signal to the latch 51 from differentiater 52 results in transfer of the next video information to the driver 61 with the ring counter 63 activating its ninth output lead. Thus, the ninth group of heating elements has been grounded in response to an output 45-9 from the M-bit counter 45.

The pulse 52-1 from differentiater 52 then causes the enabling circuit 51 to produce an output 51-2 which enables the driver 61 to produce energizing currents for the grounded heating elements to record the ninth data block f9.

The signal 52-1 from differentiater 52 is, on the other hand, applied to flip-flop 35 producing an output 35-3 to proceed the next reading operation. It is appreciated that during the interval between the end of pulse 35-2 and the begining of the next pulse 35-3 reading operation remains inactive to await the end of the first writing operation, since insignificant data blocks are disregarded or skipped so that the time needed for recording is minimized with no loss of time between successive writing operations.

While the second writing operation is in progress, the sixteenth data block f16 has been detected in response to an output 45-16 from the counter 45, generating an output 44-3 from AND gate 44.

If it is assumed that the sixteenth data block is the last one within a line video signal, the 2,048-bit counter 38 will produce an output at the count of 2,048 bits of input clock pulses indicating the end of a line video signal and resetting flip-flop 34. At this instant of time, however, the second writing operation is still in progress and the third writing operation must be accomplished in succession. For this purpose, a one-shot monostable 55 is connected to the output of flip-flop 34 to generate a pulse 54-2 from the output of OR gate 54 so that AND gate 53 is still enabled to pass an output 52-2 from the differentiater 52 at the end of the second writing operation to the latching circuit 50 for subsequent writing operation. The signal 52-2 generates a writing signal 51-3 from enabling circuit 51 so that the data block f16 is recorded.

The end of the final writing operation is detected by a NAND gate 56 whose inputs are connected to the output of enabling circuit 51 and to the output of OR gate 54. The output from the NAND gate 56 is applied to a monostable 57 whose output 57-1 (FIG. 5M) is applied to a drive means 58 which drives the recording medium in a direction normal to the linear array of heating elements by the width of a line path for subsequent line recordings.

The foregoing description shows only preferred embodiments of the present invention. Various modifications are apparent to those skilled in the art without departing from the scope of the present invention which is only limited by the appended claims. For example, the heating elements may be replaced with electrostatic electrodes as used in xerography, or electrooptical elements for producing an image on a light sensitive medium. Therefore, the embodiments shown and described are only illustrative, not restrictive.

What is claimed is:

1. A facsimile communication system including, at a transmitter station, means for successively scanning along each of a plurality of line paths within a document to generate a binary signal waveform comprising binary digits at one of first and second binary levels corresponding to the light levels of said document, means for coding the run-length of each binary digit in said waveform into a corresponding digital code for transmission to a receiver station, and at said receiver station, means for decoding the digital codes to recover the original binary signal waveform, and a plurality of energy transfer elements for transferring electrical energy to the surface of a recording medium, said elements being successively arranged along a line path and equally divided into a plurality of groups, the elements of each group being electrically connected together so as to be energizable for simultaneous transfer of energy within a predetermined period of time, said system comprising, at said transmitter station:

means for equally dividing said binary signal waveform into a plurality of data blocks equal in number to said groups of elements to detect significant data blocks in each of which at least one binary digit at said first binary level occurs;

means responsive to the start of transmission of said digital codes for measuring data blocks by needed for recording said significant data blocks by multiplying said predetermined energizable period by the number of said detected significant data blocks to cause said scanning means to proceed to the next line path at the end of said measured time interval; and at said receiver station, means for equally dividing the recovered binary signal waveform into a plurality of data blocks identical to the data blocks at said transmitter station to detect said significant data blocks; and means for selectively simultaneously energizing a group of said energy transfer elements with the binary digits of said detected significant data block so that groups of said energy transfer elements corresponding to insignificant data blocks in which binary digits are entirely at said second binary level are skipped without loss of time.

2. A facsimile communication system as claimed in claim 1, further comprising, at said transmitter station;

means for measuring a time interval of said digital codes derived from a binary signal waveform;

means for generating a time difference between the time interval measured for recording said significant data blocks and the time interval of said digital codes; and means for generating a dummy signal during the interval of said time difference for transmission to said receiver station after the transmission of said digital code.

3. A facsimile communication system as claimed in claim 1, wherein said dividing means at said transmitter station comprises:

a source of clock pulses occurring at a rate of (N × M) bits for each line scan, where N is the number of groups of energy transfer elements and M is the number of said energy transfer elements in each group;

a divide-by-M counter connected to the source of clock pulses;

a bistable device responsive to the binary digit of said first binary level in said waveform to assume a first binary state and responsive to the output from said divide-by-M counter to assume a second binary state; and an AND gate responsive to the output from said divide-by-M counter and said bistable device being in said first binary state.

4. A facsimile communication system as claimed in claim 3, wherein said time measuring means comprises:

a second source of clock pulses occurring at an interval equal to said predetermined energizable period;

a first shift register connected to accept the clock pulses from said second source;

a second shift register connected to accept the output from said AND gate; and a coincident circuit connected to said first and second shift registers to provide an output upon the coincidence of the stored data between said first and second shift registers.

* * * * *